United States Patent
Hatanaka

(10) Patent No.: US 10,331,104 B2
(45) Date of Patent: Jun. 25, 2019

(54) MACHINE TOOL, SIMULATION APPARATUS, AND MACHINE LEARNING DEVICE

(71) Applicant: FANUC Corporation, Yamanashi (JP)

(72) Inventor: Noriaki Hatanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 297 days.

(21) Appl. No.: 15/216,970

(22) Filed: Jul. 22, 2016

(65) Prior Publication Data
US 2017/0031343 A1    Feb. 2, 2017

(30) Foreign Application Priority Data
Jul. 30, 2015   (JP) ................. 2015-150470

(51) Int. Cl.
G06F 15/18    (2006.01)
G05B 19/19    (2006.01)
G06N 20/00    (2019.01)

(52) U.S. Cl.
CPC .... *G05B 19/19* (2013.01); *G05B 2219/33034* (2013.01); *G05B 2219/33037* (2013.01); *G06N 20/00* (2019.01)

(58) Field of Classification Search
CPC .......... G05B 19/19; G05B 2219/33034; G05B 2219/33037; G06N 99/005
See application file for complete search history.

(56) References Cited

U.S. PATENT DOCUMENTS

| | | |
|---|---|---|
| 2002/0195983 A1 | 12/2002 | Iwashita et al. |
| 2004/0145333 A1 | 7/2004 | Toyozawa et al. |
| 2006/0195409 A1 | 8/2006 | Sabe et al. |
| 2011/0010073 A1 | 1/2011 | Stewart et al. |
| 2015/0094846 A1 | 4/2015 | Hamm et al. |
| 2016/0202688 A1 | 7/2016 | Ogawa et al. |

FOREIGN PATENT DOCUMENTS

| | | |
|---|---|---|
| CN | 1523734 A | 8/2004 |
| DE | 60213519 T2 | 11/2006 |
| DE | 102016000100 A1 | 7/2016 |

(Continued)

OTHER PUBLICATIONS

Office Action in JP Application No. 2015-150470, dated Aug. 2, 2016.

(Continued)

*Primary Examiner* — Luis A Sitiriche
(74) *Attorney, Agent, or Firm* — Hauptman Ham, LLP

(57) ABSTRACT

A machine tool is provided with an operation evaluation section that outputs evaluation data on an operation of the machine tool and a machine learning device that performs machine learning of the movement amount of an axis. The machine learning device calculates a reward from physical-amount data on the machine tool and the evaluation data, performs adjustment of the movement amount of the axis based on a machine learning result of the adjustment of the movement amount of the axis and the physical-amount data, and performs the machine learning of the adjustment of the movement amount of the axis based on the adjusted movement amount of the axis, the physical-amount data after the operation of the machine tool based on the movement amount of the axis, and the reward.

4 Claims, 8 Drawing Sheets

(56) References Cited

FOREIGN PATENT DOCUMENTS

| EP | 2607975 A1 | 6/2013 |
|---|---|---|
| JP | 4-135209 A | 5/1992 |
| JP | 2002-355724 A | 12/2002 |
| JP | 2004-280772 A | 10/2004 |
| JP | 2006-043836 A | 2/2006 |
| JP | 2006-268812 A | 10/2006 |

OTHER PUBLICATIONS

Office Action in JP Application No. 2015-150470, dated Nov. 22, 2016.
Office Action in CN Application No. 201610619708.4, dated Mar. 13, 2018, 12pp.
Office Action in DE Application No. 102016008994.6, dated Dec. 7, 2018, 19pp.

| | |
|---|---|
| TRAVELING DIRECTION OF TOOL | :($\delta$ xt-1,$\delta$ zt-1) |
| DISTANCE UNTIL DEVIATION FROM TOOL PATH | :(Oxp,Oxm,Ozp,Ozm) |
| CURRENT SPEED OF EACH AXIS | :($\delta$ xt-1,$\delta$ zt-1) |
| CURRENT ACCELERATION OF EACH AXIS | :($\delta$ xt-1-$\delta$ xt-2,$\delta$ zt-1-$\delta$ zt-2) |

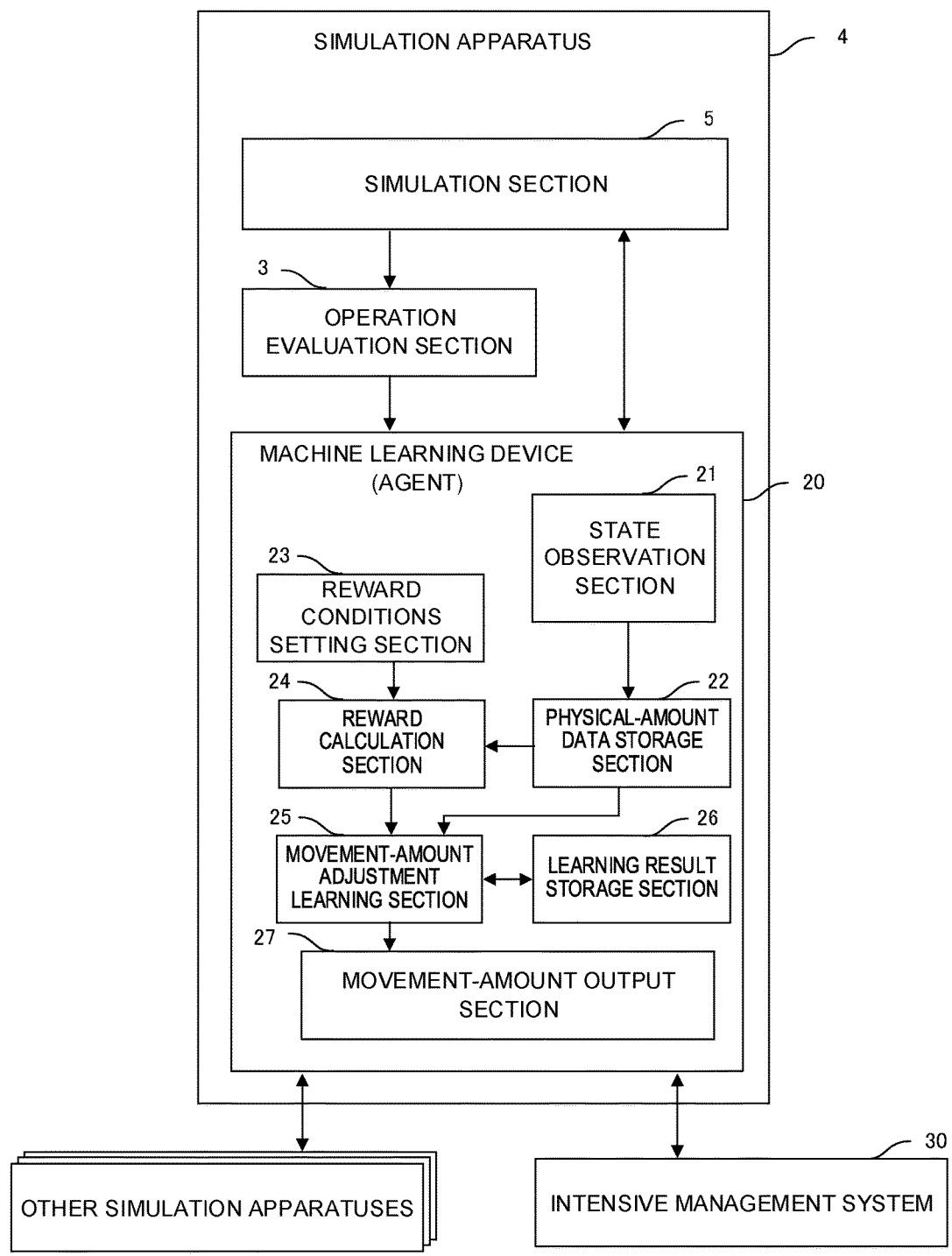

COMMAND PATH ----→
ALLOWABLE ERROR

COMMAND PATH ----→
ALLOWABLE ERROR

WORKPIECE
DEVIATION FROM ALLOWABLE ERROR RANGE
MACHINING FAILURE
COMMAND PATH ----→
ALLOWABLE ERROR

WORKPIECE
DEVIATION FROM ALLOWABLE ERROR RANGE
INTERFERENCE
COMMAND PATH ----→
ALLOWABLE ERROR

MACHINE TOOL, SIMULATION APPARATUS, AND MACHINE LEARNING DEVICE

RELATED APPLICATIONS

The present application claims priority to Japanese Application Number 2015-150470, filed Jul. 30, 2015, the disclosure of which is hereby incorporated by reference herein in its entirety.

BACKGROUND OF THE INVENTION

1. Field of the Invention

The present invention relates to a machine tool and, in particular, to a machine tool provided with a function to optimize a movement path in the machining of a workpiece.

2. Description of the Related Art

In conventional machining of a workpiece, a machining program is created and a machine tool is controlled based on this machining program to machine the workpiece. A machining speed for machining a workpiece is commanded as a movement speed of an axis in a machining program and indicates a maximum speed of the relative movement (tool movement) between a tool and a machining object based on the command. In the actual movement of a machine tool, the movement speed of the axis fluctuates at the start of machining or at a corner part, a curve part, or the like, according to an acceleration/deceleration time constant of each axis.

Further, as shown in FIGS. 8A and 8B, there is an allowable error relative to a target movement path of a tool in the machining of a workpiece. In order to maintain the accuracy of machining of a workpiece at a prescribed level, it is necessary to make an adjustment such that the tool moves within the range of the allowable error from a command path commanded by a machining program. Therefore, an operator of a machine tool conventionally makes, while confirming the machining surface accuracy of a machining object, an adjustment by changing an acceleration/deceleration time constant, changing a speed commanded in a program, etc.

As a related art associated with such machining of a workpiece, Japanese Patent Application Laid-open No. 2006-043836 discloses a method for setting machining conditions, in which machining path information is created and machining conditions are set using a machining pattern so as to reduce machining time while taking account of machining accuracy.

In a case where a machine tool is controlled so as to machine a workpiece, if a tool path deviates from a range that is defined by adding an allowable error to a command path commanded by a machining program, then a failure in a machining object or breakage of the machining object, tool, and machine tool may possibly occur. FIGS. 9A and 9B show examples in which a failure in a machining object (FIG. 9A) and breakage of a machining object or a tool (FIG. 9B) have occurred as a result of such deviation of a tool path during machining of a workpiece.

In general, a change amount from a position of an axis of a machine tool at certain time to a position of the axis at the next moment is indicated by data called a command pulse from a numerical control system. The command pulse is output to the machine tool as an outcome of interpolation processing, acceleration/deceleration control, or the like being carried out based on a command by a machining program. Such a command pulse output from the numerical control system is influenced by an acceleration/deceleration time constant of each axis set in the machine tool, and the acceleration/deceleration time constant of each axis is set by an engineer of a machine tool manufacturer when shipping the machine tool. In addition, the acceleration/deceleration time constant is also adjusted by an engineer of the machine tool manufacturer according to the characteristics of main machining objects, when installing the machine tool. Therefore, whether it is possible to acquire an optimum change amount depends on the experience and ability of an engineer of the machine tool manufacturer, the circumstances of the machining, or the like, and an optimum change amount cannot necessarily be acquired unconditionally.

In addition, the art disclosed in Japanese Patent Application Laid-open No. 2006-043836 is applicable only to a situation corresponding to a given machining pattern and does not enable flexible response to a wide diversity of situations.

SUMMARY OF THE INVENTION

In view of the above circumstances, the present invention has an object of providing a machine tool that performs machine learning of the operation of a tool that uses, as a tool path, the contour of a prescribed machining object formed with straight lines and curves.

According to an embodiment of the present invention, there is provided a machine tool that drives at least one axis based on a program to perform machining of a workpiece, the machine tool including: an operation evaluation section that evaluates an operation of the machine tool to output evaluation data; and a machine learning device that performs machine learning of a movement amount of the axis. The machine learning device has a state observation section that acquires physical-amount data including at least an axis position of the axis of the machine tool and the evaluation data output from the operation evaluation section, a reward calculation section that calculates a reward based on the physical-amount data and the evaluation data acquired by the state observation section, a movement-amount adjustment learning section that performs an adjustment of the movement amount of the axis based on a machine learning result of the adjustment of the movement amount of the axis and the physical-amount data acquired by the state observation section, and a movement-amount output section that outputs the movement amount of the axis adjusted by the movement-amount adjustment learning section. Further, the movement-amount adjustment learning section is configured to perform the machine learning of the adjustment of the movement amount of the axis based on the adjusted movement amount of the axis, the physical-amount data acquired by the state observation section after an operation of the machine tool based on the output movement amount of the axis, and the reward calculated by the reward calculation section.

The reward calculation section may be configured to calculate a positive reward when a combined speed of the axis is fast and configured to calculate a negative reward when there is a deviation from a range of a command path commanded by the program.

The machine tool may be connected to at least one another machine tool and mutually exchange or share the machine learning result with the other machine tool.

The movement-amount adjustment learning section may be configured to perform, in order to make the reward maximum, the machine learning using the adjusted movement amount of the axis and an evaluation function in which the physical-amount data acquired by the state observation section is expressed by an argument.

According to another embodiment of the present invention, there is provided a simulation apparatus for simulating a machine tool that drives at least one axis based on a program to perform machining of a workpiece, the simulation apparatus including: an operation evaluation section that evaluates a simulation operation of the machine tool to output evaluation data; and a machine learning device that performs machine learning of a movement amount of the axis. The machine learning device has a state observation section that acquires simulated physical-amount data including at least an axis position of the axis of the machine tool and the evaluation data output from the operation evaluation section, a reward calculation section that calculates a reward based on the physical-amount data and the evaluation data acquired by the state observation section, a movement-amount adjustment learning section that performs an adjustment of the movement amount of the axis based on a machine learning result of the adjustment of the movement amount of the axis and the physical-amount data acquired by the state observation section, and a movement-amount output section that outputs the movement amount of the axis adjusted by the movement-amount adjustment learning section. Further, the movement-amount adjustment learning section is configured to perform the machine learning of the adjustment of the movement amount of the axis based on the adjusted movement amount of the axis, the physical-amount data acquired by the state observation section after the simulation operation of the machine tool based on the output movement amount of the axis, and the reward calculated by the reward calculation section.

According to still another embodiment of the present invention, there is provided a machine learning device that has performed machine learning of an adjustment of a movement amount of at least one axis of a machine tool, the machine learning device including: a learning result storage section that stores a machine learning result of the adjustment of the movement amount of the axis; a state observation section that acquires physical-amount data including at least an axis position of the axis of the machine tool; a movement-amount adjustment learning section that performs the adjustment of the movement amount of the axis based on the machine learning result of the adjustment of the movement amount of the axis and the physical-amount data acquired by the state observation section; and a movement-amount output section that outputs the movement amount of the axis adjusted by the movement-amount adjustment learning section.

According to an embodiment of the present invention, it becomes possible to realize the machining of a workpiece maintaining machining accuracy in a shorter period of time by the introduction of machine learning into the determination of an optimum movement amount of each axis.

BRIEF DESCRIPTION OF THE DRAWINGS

The above and other objects and features of the present invention will become apparent from the descriptions of the following embodiments with reference to the accompanying drawings in which;

FIG. 7 is a function block diagram of a simulation apparatus according to the embodiment of the present invention;

DETAILED DESCRIPTION OF THE PREFERRED EMBODIMENTS

Figure 1B:
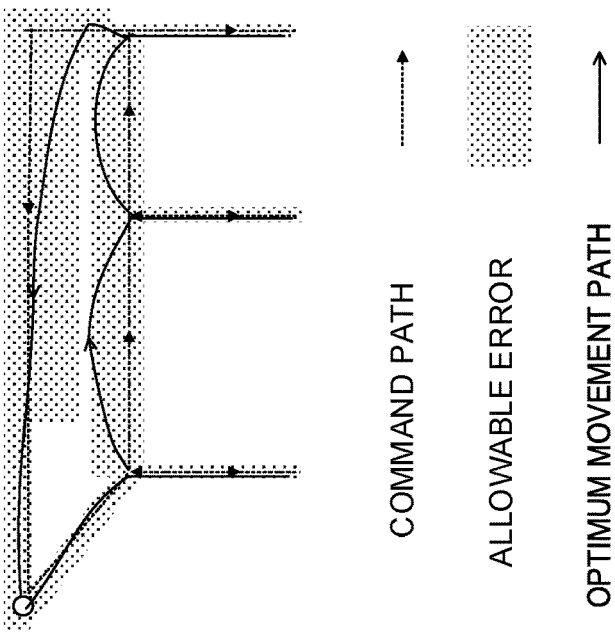
FIGS. 1A and 1B are diagrams showing examples 1 and 2 in which a machining path of a machine tool is optimized according to the present invention.
Figure 1A:
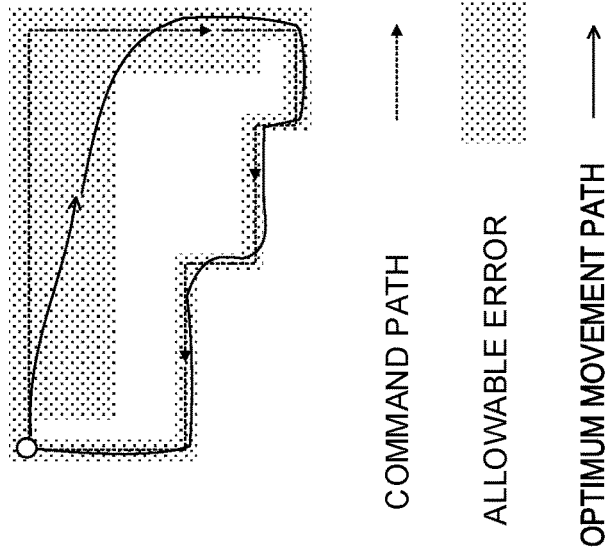

In the present invention, a machine learning device acting as artificial intelligence is introduced into a machine tool that machines a workpiece, and machine learning is performed about a movement amount of each axis of the machine tool in the machining of the workpiece based on a machining program, whereby the movement amount of each axis of the machine tool is adjusted to be optimum in the machining of the workpiece as shown in FIGS. 1A and 1B. In the adjustment of the movement amount of each axis, faster movement of a tool and a non-deviation from a range in which an allowable error is added to a tool path are targeted. Thus, the machining of the workpiece maintaining machining accuracy is realized in a shorter period of time.

1 Machine Learning

In general, machine learning is classified into various algorithms such as supervised learning and unsupervised learning according to its target or conditions. The present invention has an object of learning a movement amount of each axis of a machine tool in the machining of a workpiece based on a machining program. In consideration of the fact that it is hard to explicitly indicate what type of action (adjustment of the movement amount of each axis) may be appropriately performed with respect to a movement path of a tool based on an output movement amount of each axis, a reinforcement learning algorithm in which a machine learning device automatically learns an action for achieving an object only with the acceptance of a reward is employed.

Figure 2:
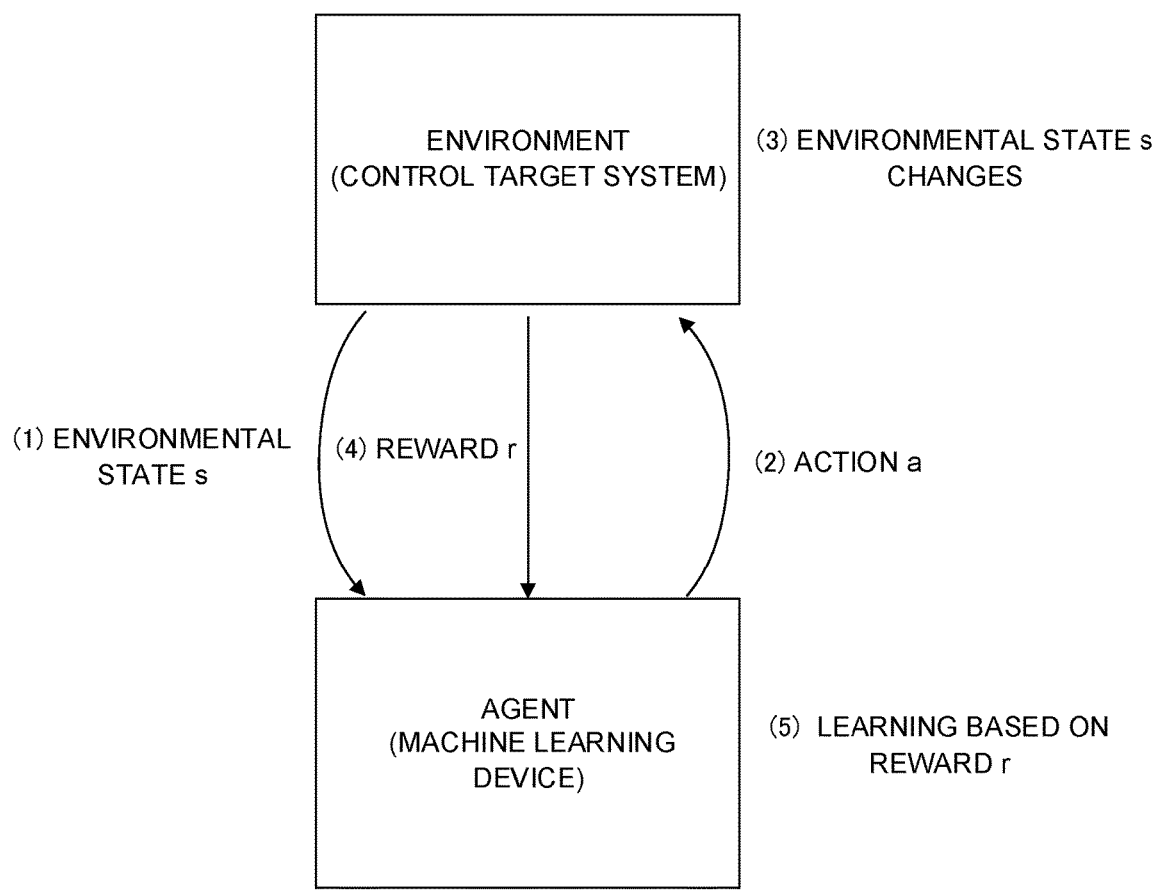
FIG. 2 is a diagram for describing the basic concept of a reinforcement learning algorithm.

FIG. 2 is a diagram for describing the basic concept of a reinforcement learning algorithm.

In reinforcement learning, agent learning and an action are advanced by the interactions between an agent (machine learning device) acting as a learning subject and an environment (control target system) acting as a control target. More specifically, the following interactions are performed between the agent and the environment.

(1) The agent observes an environmental state $s_t$ at certain time.
(2) The agent selects and performs an action $a_t$ which the agent is allowed to take based on an observation result and past learning.
(3) The environmental state $s_t$ changes to a next state $s_{t+1}$ after the action $a_t$ is performed.

(4) The agent accepts a reward $r_{t+1}$ based on the state change as a result of the action $a_t$.

(5) The agent advances the learning based on the state $s_t$, the action $a_t$, the reward $r_{t+1}$, and a past learning result.

In the learning of the above (5), the agent acquires the mapping of an observed state $s_t$, an action $a_t$, and a reward $r_{t+1}$ as reference information for determining an amount of a reward which the agent is allowed to obtain in the future. For example, when the number of states that the agent is allowed to have at each time is m and the number of actions that the agent is allowed to take is n, the agent obtains a two-dimensional arrangement of m×n, in which rewards $r_{t+1}$ corresponding to pairs of states $s_t$ and actions $a_t$ are stored, by repeatedly performing actions.

Then, with a value function (evaluation function) indicating to what degree a current state or action is valuable based on the above acquired mapping, the agent updates the value function (evaluation function) while repeatedly performing actions to learn an optimum action corresponding to a state.

A "state value function" is a value function indicating to what degree a certain state $s_t$ is valuable. The state value function is expressed as a function using a state as an argument and updated based on a reward obtained with respect to an action in a certain state, a value of a future state changed with the action, or the like in learning from repeated actions. The update formula of the state value function is defined according to a reinforcement learning algorithm. For example, in temporal-difference (TD) learning indicating as one of reinforcement learning algorithms, the state value function is defined by the following formula (1). Note that in the following formula (1), α indicates a learning coefficient, γ indicates a discount rate, and the learning coefficient and the discount rate fall within 0<α≤1 and 0<γ≤1, respectively.

$$V(s_t) \leftarrow V(s_t) + \alpha[r_{t+1} + \gamma V(s_{t+1}) - V(s_t)] \quad (1)$$

In addition, an "action value function" is a value function indicating to what degree an action $a_t$ is valuable in a certain state $s_t$. The action value function is expressed as a function using a state and an action as arguments and updated based on a reward obtained with respect to an action in a certain state, an action value of a future state changed with the action, or the like in learning from repeated actions. The update formula of the action value function is defined according to a reinforcement learning algorithm. For example, in Q-learning indicating as one of typical reinforcement learning algorithms, the action value function is defined by the following formula (2). Note that in the following formula (2), α indicates a learning coefficient, γ indicates a discount rate, and the learning coefficient and the discount rate fall within 0<α≤1 and 0<γ≤1, respectively.

$$Q(S_t, a_t) \leftarrow Q(s_t, a_t) + \alpha(r_{t+1} + \gamma \max/a\ Q(s_{t+1}, a) - Q(s_t, a_t)) \quad (2)$$

Note that as a method for storing a value function (evaluation function) as a learning result, a method using a supervised learning device such as a support vector machine (SVM) and a neural network of a multiple-value output that input a state $s_t$ and an action $a_t$ and output a value (evaluation), for example, when the state s takes many states, or the like is available besides a method using an approximate function and a method using an arrangement.

Further, in the selection of an action in the above (2), an action $a_t$ by which a reward ($r_{t+1} + r_{t+2} + \ldots$) over a future becomes maximum in a current state $s_t$ (an action for changing to a most valuable state when a state value function is used or a most valuable action in the state when an action value function is used) is selected using a value function (evaluation function) generated by past learning. Note that during learning, an agent may select a random action with a constant probability for the purpose of advancing the learning in the selection of an action in the above (2) (ε-greedy method).

As described above, learning is advanced by repeatedly performing the above (1) to (5). Even in a new environment after the completion of learning in a certain environment, the learning may be advanced so as to be adapted to the new environment by additional learning. Accordingly, applying the the learning to the determination of a movement amount of each axis of a machine tool in the machining of a workpiece based on a machining program as in the present invention, it becomes possible to perform the learning of the movement amount of each axis in a short period of time even, even in case where a new machining program is created, by performing an addition learning in which the new machining program serves as a new environment with respect to the learning of the movement amount of each axis of the machine tool in the past machining of the workpiece.

In addition, reinforcement learning employs a system in which a plurality of agents are connected to each other via a network or the like, and information on states s, actions a, rewards r, or the like is shared between the agents and applied to each learning, whereby each of the agents performs dispersed reinforcement learning in consideration of the environments of the other agents to be allowed to perform efficient learning. Also in the present invention, if a plurality of agents (machine learning devices) controlling a plurality of environments (machine tools acting as control targets) perform dispersed machine learning in a state where they are connected to each other via a network or the like, it becomes possible to cause the agents to efficiently perform a learning of a movement amount of each axis in the machining of a workpiece based on a machining program.

Note that although various methods such as Q-learning, an SARSA method, TD learning, and an AC method have been commonly known as reinforcement learning algorithms, any of the above reinforcement algorithms may be applied to the present invention. Since each of the reinforcement learning algorithms has been commonly known, its detailed description will be omitted in the specification.

Hereinafter, a description will be given, based on a specific embodiment, of the machine tool of the present invention into which a machine learning device is introduced.

2 Embodiment

Figure 3:
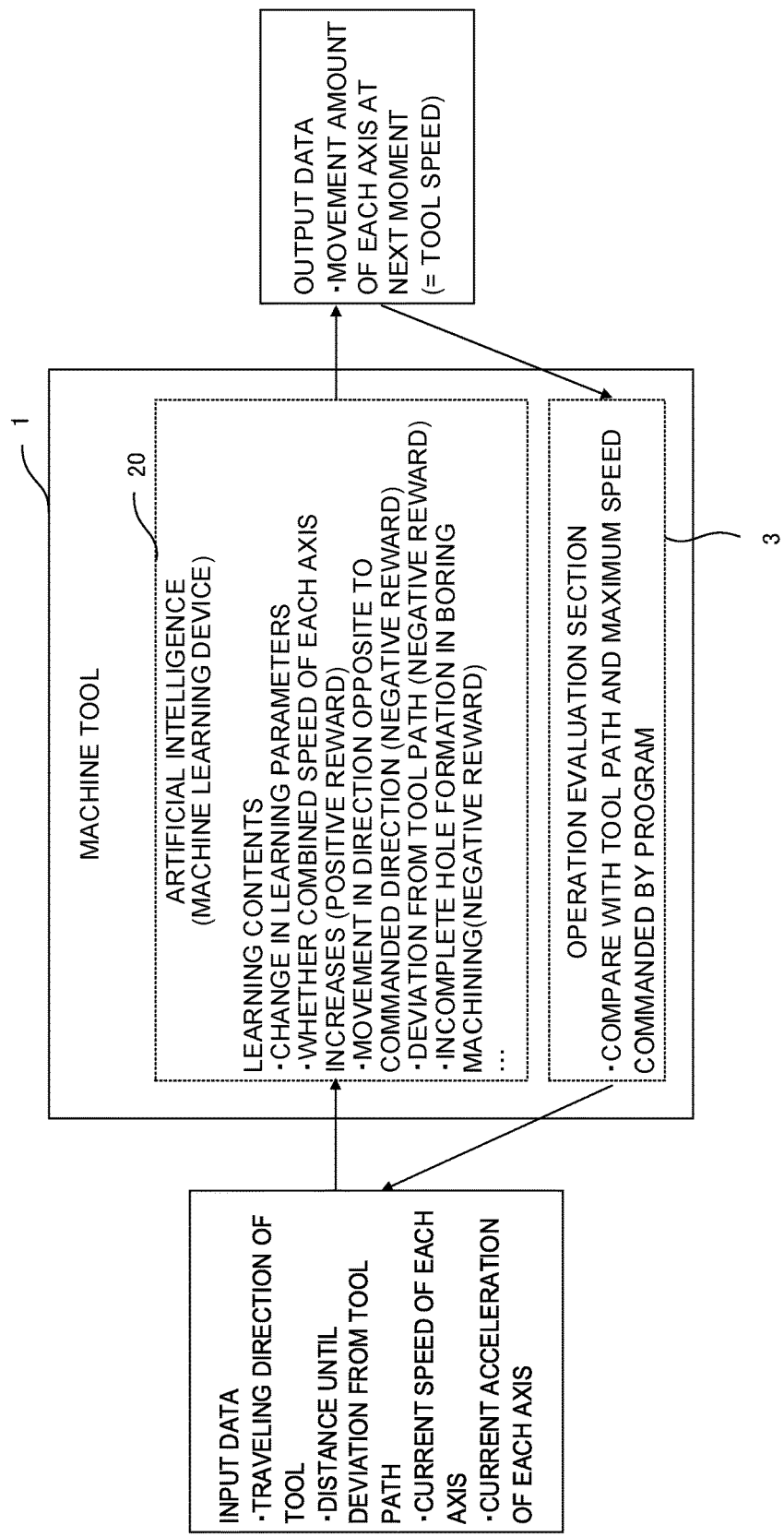
FIG. 3 is an image diagram regarding the machine learning of the machine tool according to an embodiment of the present invention.

FIG. 3 is a diagram showing an image regarding the machine learning of the movement amount of each axis in a machine tool into which a machine learning device acting as artificial intelligence according to an embodiment of the present invention is introduced. Note that FIG. 3 shows only configurations necessary for describing the machine learning by the machine tool according to the embodiment.

In the embodiment, a traveling direction of a tool, a distance until a deviation from a tool path, a current speed of each axis, and a current acceleration of each axis are input data items as information for causing a machine learning device 20 to specify an environment (a state $s_t$ in "(1 Machine Learning)" described above). These values include data acquired from each section of the machine tool and data calculated by an operation evaluation section 3 based on the acquired data.

Figure 4:
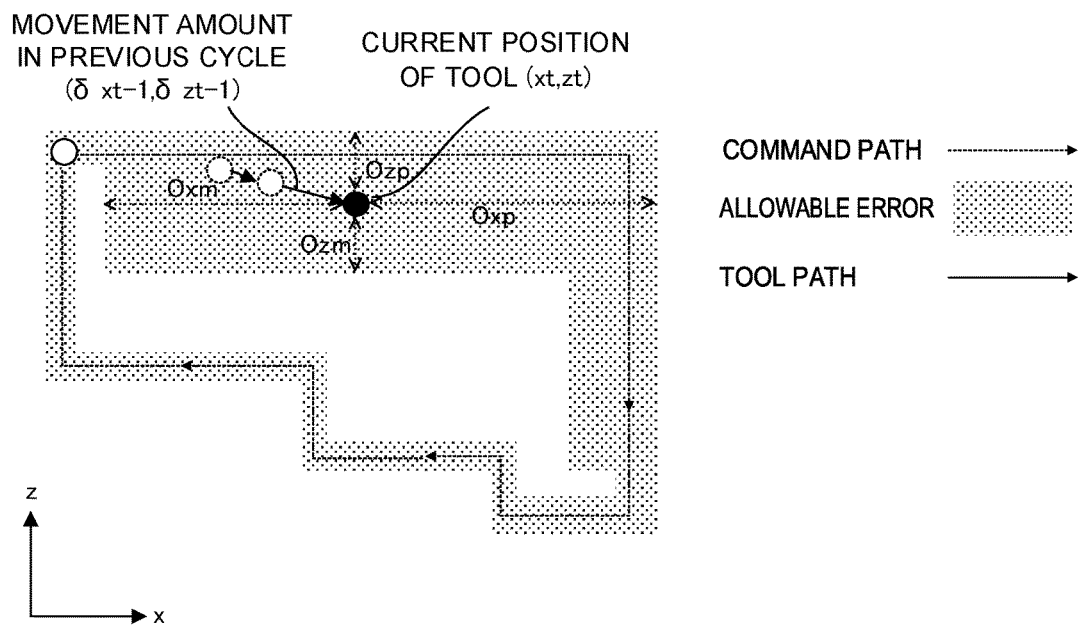
FIG. 4 is a diagram for describing each data handled in the embodiment of the present invention.

FIG. 4 is a diagram for describing each data regarding a machine tool 1 according to the embodiment.

In the machine tool 1 according to the embodiment, a command path obtained by analyzing a machining program and an allowable error from the command path defined in advance by an operator each shown in FIG. 4 are stored in a memory not shown. Besides an axis position ($x_t$, $z_t$) of each axis, a movement speed ($\delta x_{t-1}$, $\delta z_{t-1}$) of each axis, an acceleration ($\delta x_{t-1} - \delta x_{t-2}$, $\delta z_{t-1} - \delta z_{t-2}$) of each axis, or the like at time t obtained from the machine tool 1, the input data described above includes data calculated by the operation evaluation section 3 based on each of the data described above such as a distance until each axis position deviates from a range in which an allowable error is added to the command path.

Note that FIG. 4 shows an example of each input data in an X-Z two-dimensional coordinate system. However, when the machine tool has three or more axes, the number of the dimensions of input data may be appropriately increased to suit the number of the axes.

In the embodiment, the machine learning device 20 outputs a movement amount of each axis at a next moment (a current cycle in the control cycle of a control apparatus) as output data to an environment (an action $a_t$ in "(1 Machine Learning)" described above). Note that in the embodiment, a movement amount of each axis output at a certain cycle is consumed (moved) without a delay within the cycle by servo motors that drive respective axes. Therefore, the movement amount is handled as a movement speed of a tool as it is hereinafter.

In addition, in the embodiment, an increase in the combined speed of each axis (positive reward), a movement in a direction opposite to a commanded direction (negative reward), a deviation from a tool path (negative reward), an excess of a maximum speed (negative reward), or the like is employed as a "reward" (a reward $r_t$ in "(1 Machine Learning)" described above) given to the machine learning device 20. The "reward" is calculated by the operation evaluation section 3 based on an achievement degree of each reward according to input data, output data, or the like. Note that an operator may appropriately set as to which data is used to determine the reward according to the machining contents of a machining program in the machine tool 1. For example, in boring machining, an incomplete formation of a hole may be defined as a negative reward.

Moreover, in the embodiment, the machine learning device 20 performs machine learning based on input data, output data, and a reward described above. In the machine learning, a state $s_t$ is defined by the combination of input data at certain time t, the output of a movement amount performed with respect to the defined state $s_t$ is equivalent to an action $a_t$, and a value evaluated and calculated based on input data newly obtained as a result of the output of the movement amount due to the action $a_t$ is equivalent to a reward $r_{t+1}$. As in "(1 Machine Learning)" described above, the state $s_t$, the action $a_t$, and the reward $r_{t+1}$ are applied to the update formula of a value function (evaluation function) corresponding to a machine-learning algorithm to advance the learning.

Here, a description will be given, with reference to the function block diagram of FIG. 5, of a machine tool according to the embodiment of the present invention.

A machine tool 1 of the embodiment is provided with a driving section (not shown) such as a servo motor that drives each axis in the machining of a workpiece, a servo control section (not shown) that controls the servo motor, peripheral equipment (not shown), a numerical control section 2 that controls the driving section and the peripheral equipment, an operation evaluation section 3 that evaluates an operation of the machine tool based on an operation of the driving section or the peripheral equipment and each data acquired from the numerical control section 2, and a machine learning device 20 acting as artificial intelligence that performs machine learning.

Figure 5:
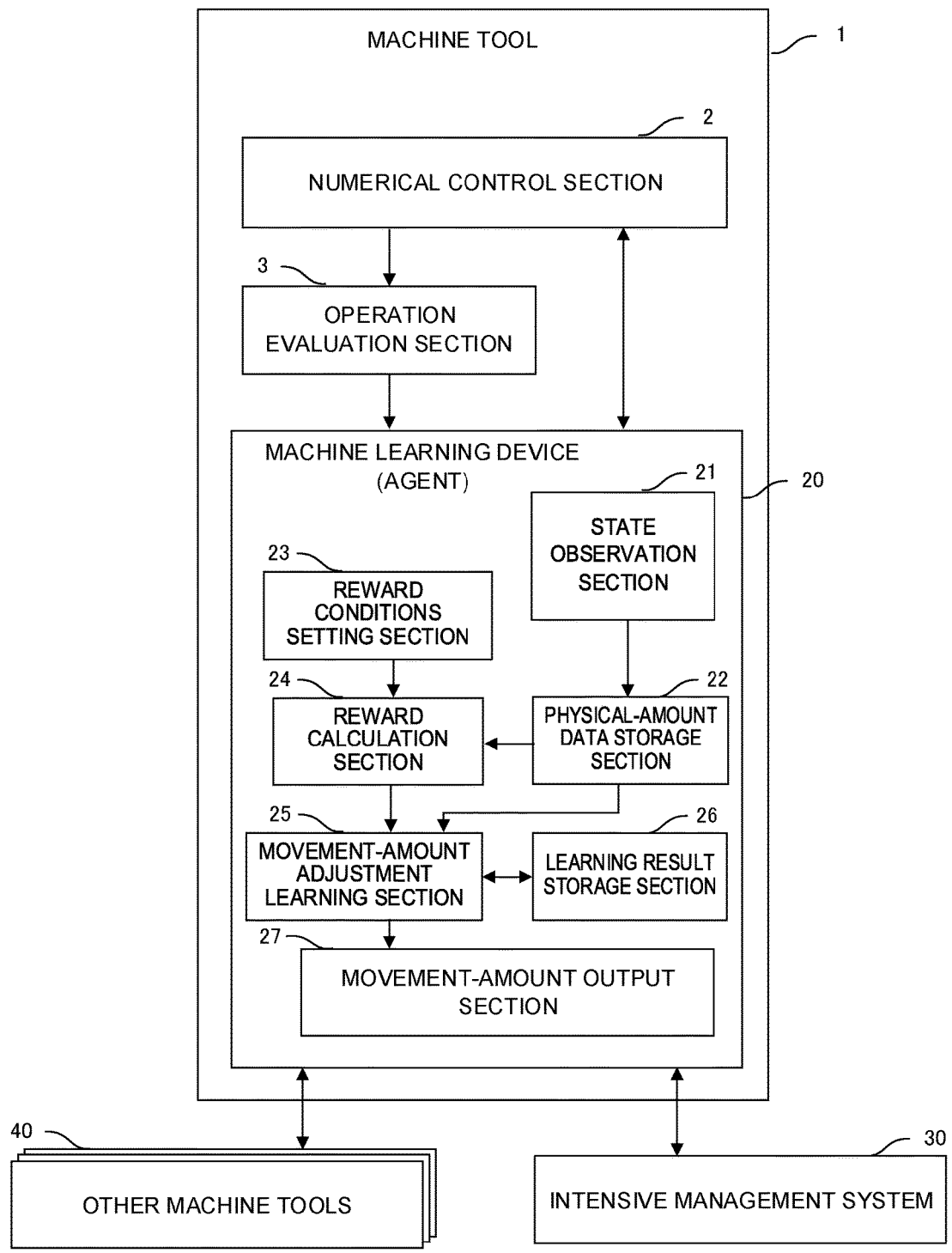
FIG. 5 is a function block diagram of the machine tool according to the embodiment of the present invention.

When the configurations of the machine tool shown in FIG. 5 are compared with the elements of the reinforcement learning algorithm shown in FIG. 2, an entirety including the driving section such as a servo motor and the servo control section (each not shown), the peripheral equipment (not shown), the control section 2, or the like normally provided in the machine tool 1 of FIG. 5 corresponds to the "environment" in the reinforcement learning algorithm of FIG. 2. In addition, the machine learning device 20 of the machine tool 1 of FIG. 5 corresponds to the "agent" in the reinforcement learning algorithm of FIG. 2.

The numerical control section 2 analyzes a machining program read from a memory not shown or input via input equipment not shown and controls each section of the machine tool 1 based on control data obtained as a result of the analysis. In general, the numerical control section 2 performs control based on an analysis result of the machining program. However, in the embodiment, the control of each axis that drives the tool of the machine tool 1 is performed according to a movement amount of each axis output from the machine learning device 20.

The numerical control section 2 is configured to set an "allowable error" indicating a range in which the deviation of a tool from a command path commanded by a machining program is allowed. The "allowable error" is defined as a distance in each axial direction relative to each command path or defined as a region around a command path. The "allowable error" is defined such that (1) the allowable error is stored in advance in a non-volatile memory inside the numerical control section as a constant value or an operator of the machine tool sets the constant value in advance before starting machining, (2) the allowable error is commanded as part of a machining command in a machining program, or (3) the allowable error falls within a movable range set in advance in the machine tool or falls within a movable range restricted by the interference of a jig that fixes a workpiece or the like. Alternatively, the "allowable error" is defined by the combination of the above conditions (1) to (3).

The operation evaluation section 3 evaluates a movement amount of each axis of the machine tool 1 output from the machine learning device 20 at each control cycle based on an axis position of each axis of the machine tool 1 acquired from the numerical control section 2, a tool path commanded by a machining program analyzed by the numerical control section 2, a maximum speed of a tool commanded by the machining program, or the like, and then notifies the machine learning device 20 of an evaluation result. The evaluation of an action by the operation evaluation section 3 is used to calculate a reward in the learning of the machine learning device 20.

Examples of the evaluation of an action include the angle between a movement direction based on a movement amount of each axis of the machine tool 1 and a movement direction of a command path commanded by a machining program near a current position of a tool grasped by an axis position of each axis of the machine tool 1, the degree to which a current position of a tool deviates from a range in which an allowable error is added to a command path, and the difference between a movement speed based on a movement amount of each axis and a maximum speed commanded by a machining program near a current position of a tool. However, an action may be evaluated in any way so long as the evaluation of the quality of the action output from the machine learning device 20 is made possible.

The machine learning device 20 that performs machine learning is provided with a state observation section 21, a physical-amount data storage section 22, a reward conditions setting section 23, a reward calculation section 24, a movement-amount adjust learning section 25, a learning result storage section 26, and a movement-amount output section 27. The machine learning device 20 may be provided inside the machine tool 1 or may be provided in a personal computer or the like outside the machine tool 1.

The state observation section 21 observes physical-amount data regarding the machine tool 1 via the numerical control section 2 and acquires the observed physical-amount data inside the machine learning device 20. In addition, the state observation section 21 acquires an evaluation result of an operation by the operation evaluation section 3 inside the machine learning device 20. The observed and acquired physical-amount data includes, besides an axis position, a speed, and an acceleration of each axis described above, temperature, current, voltage, pressure, time, torque, force, consumption power, and a calculation value calculated by performing the arithmetic processing of each physical amount, or the like. In addition, the evaluation result of the operation by the operation evaluation section 3 includes the angle between a command path and a movement direction of a tool, the degree to which a current position of a tool deviates from a range in which an allowable error is added to a tool path, the difference between a movement speed of a tool and a commanded maximum speed, or the like.

The physical-amount data storage section 22 receives and stores physical-amount data and outputs the stored physical-amount data to the reward calculation section 24 and the movement-amount adjustment learning section 25. The physical-amount data input to the physical-amount data storage section 22 may be data acquired by the latest machining operation or data acquired by a past machining operation. In addition, it is also possible for the physical-amount data storage section 22 to receive and store physical-amount data stored in another machine tool 40 or an intensive management system 30, or is possible for the physical-amount data storage section 22 to output physical-amount data stored in the physical-amount data storage section 22 to output another machine tool 40 or the intensive management system 30.

The reward conditions setting section 23 sets conditions for giving rewards in machine learning. Positive and negative rewards are given and may be appropriately set. In addition, an input to the reward conditions setting section 23 may be performed via a personal computer, a tablet terminal, or the like used in the intensive management system. However, with an input via the manual data input (MDI) device (not shown) of the machine tool 1, it becomes possible to easily set conditions for giving rewards.

The reward calculation section 24 analyzes physical-amount data input from the state observation section 21 or the physical-amount data storage section 22 based on conditions set by the reward conditions setting section 23, and outputs calculated rewards to the movement-amount adjustment learning section 25.

Hereinafter, a description will be given of an example of reward conditions set by the reward conditions setting section 23 in the machine learning device 20 of FIG. 5.
(Reward 1: Increase in Combined Speed of Each Axis (Positive Reward and Negative Reward))

Since the cycle time of machining improves when a combined speed of each axis exceeds a past combined speed of each axis, a positive reward is given according to an increasing degree of the speed.

On the other hand, since a failure or the like occurs in the machine tool 1 when a combined speed of each axis exceeds a commanded maximum speed or when a speed of each axis exceeds a maximum speed of each axis set in the machine tool 1, a negative reward is given according to an excess degree of the speed.
(Reward 2: Movement in Direction Different from Commanded Direction)

In view of an angle formed between a movement direction of a tool based on a movement amount of each axis of the machine tool 1 and a movement direction of a command path commanded by a machining program near a current position of the tool grasped from an axis position of each axis of the machine tool 1, when the movement direction of the tool is greatly different from the command path commanded by the machining program, a negative reward is given according to its degree. As an example of a negative reward, when an angle formed between a movement direction of a tool and a movement direction of a command path is greater than a prescribed angle (for example, within ±45 degrees), a value obtained by multiplying the difference by a prescribed coefficient may be given as a negative reward. Alternatively, when the angle simply exceeds 180 degrees (in a direction opposite to the movement direction of the command path), a negative reward may be given.
(Reward 3: Deviation from Tool Path)

A negative reward is given according to the degree to which a current position of a tool deviates from a range in which an allowable error is added to a command path commanded by a machining program. The deviation degree may be regarded as the distance amount between the current position of the tool and the range in which the allowable error is added to the command path.
(Reward 4: Excess of Maximum Speed)

When a movement speed of a tool exceeds a maximum speed commanded by a machining program, a negative reward is given according to its excess amount.

Referring back to FIG. 5, the movement-amount adjustment learning section 25 performs machine learning (reinforcement learning) based on an adjustment result of the movement amount of each axis of the machine tool 1 performed by the movement-amount adjustment learning section 25 itself, physical-amount data including input data or the like stored in the physical-amount data storage section 22, and a reward calculated by the reward calculation section 24. In addition, the movement-amount adjustment learning section 25 adjusts a movement amount of each axis based on current physical-amount data according to a past learning result. Here, the adjustment of the movement amount of each axis corresponds to the "action a" used in the machine learning in the reinforcement learning algorithm of FIG. 2.

As a method for adjusting a movement amount, for example, the combination of movement amounts of each axis in positive and negative directions (action 1: (X-axis movement amount, Z-axis movement amount)=(1, 0), action 2: (X-axis movement amount, Z-axis movement amount)= (2, 0), . . . , action n: (X-axis movement amount, Z-axis movement amount)=($\delta x_{max}$, $\delta z_{max}$)) may be prepared in advance as a selectable action, and an action by which a maximum reward will be obtained in the future based on a past learning result may be selected. In addition, an ε-greedy method described above may be employed to select a random action with a prescribed probability to advance learning.

Here, in the machine learning performed by the movement-amount adjustment learning section 25, a state $s_t$ is defined by the combination of physical-amount data at certain time t, and the adjustment of a movement amount of each axis according to the defined state $s_t$ and the output of an adjustment result from the movement-amount output section 27 that will be described later are equivalent to an action $a_t$. Then, a value calculated by the reward calculation section 24 based on data obtained as a result of the movement of each axis of the machine tool 1 according to the adjustment result is equivalent to a reward $r_{t+1}$.

A value function used in the learning is determined according to an applied learning algorithm. For example, when Q-learning is used, it is only necessary to update an action value function $Q(s_t, a_t)$ according to the above formula (2) to advance the learning.

Figure 6:
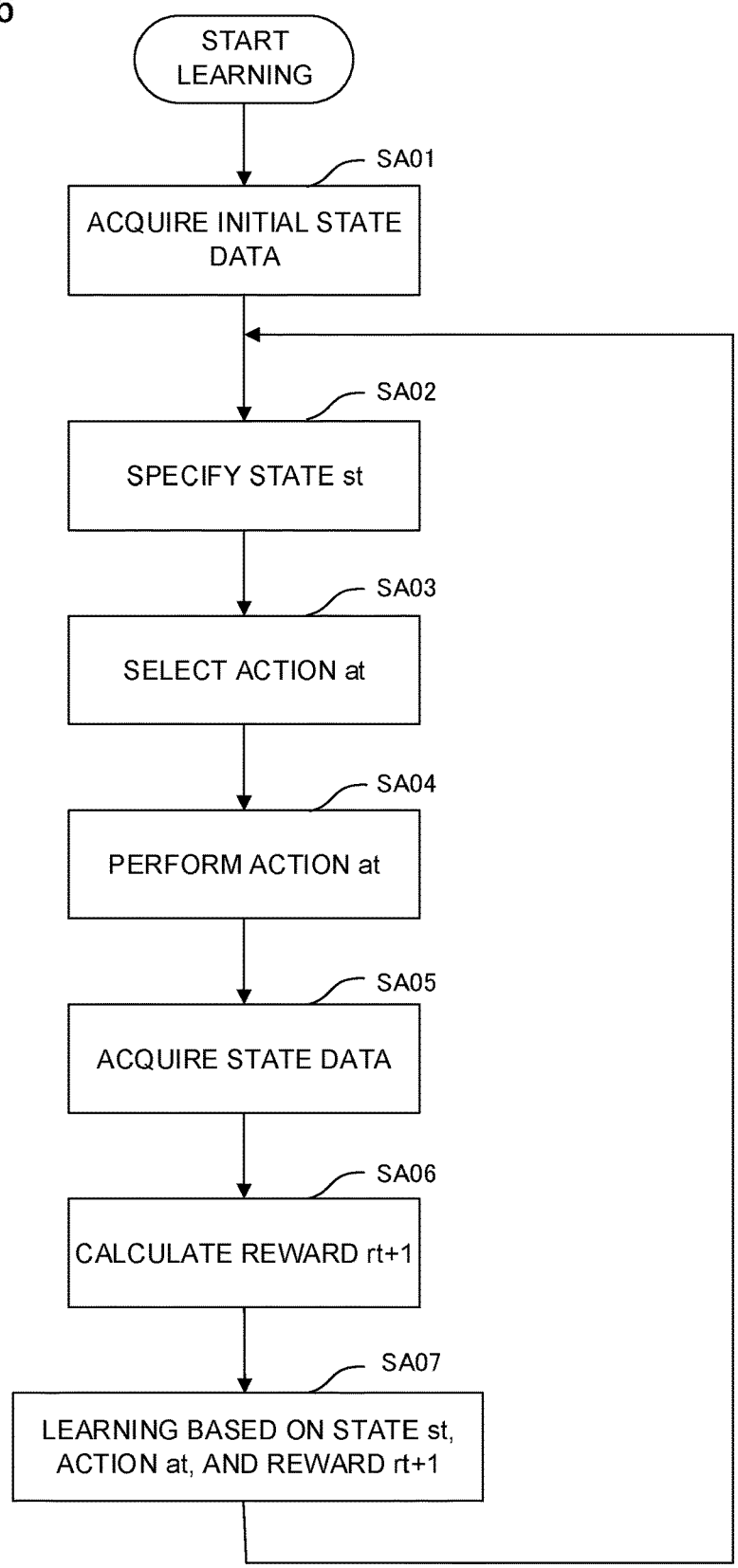
FIG. 6 is a flowchart for describing the flow of the machine learning performed by a movement-amount adjustment learning section in the machine learning device of FIG. 5.
Figure 8A:
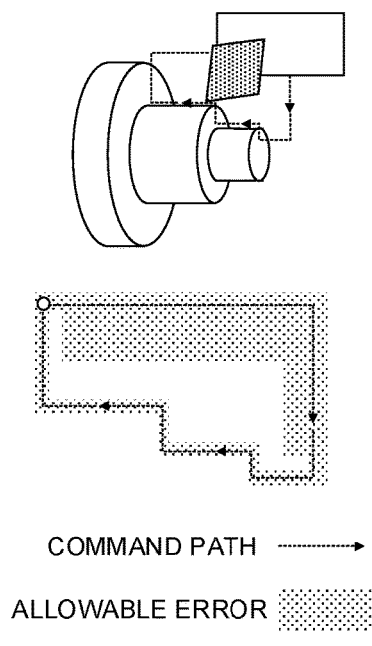
FIGS. 8A and 8B are diagrams for describing an allowable error in the machining of a workpiece.
Figure 8B:
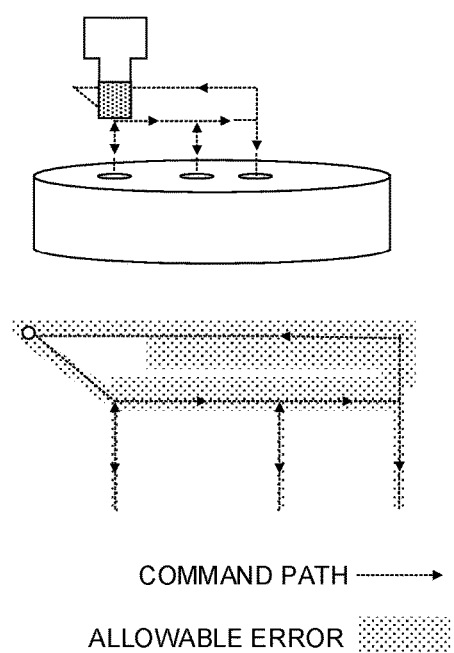
Figure 9A:
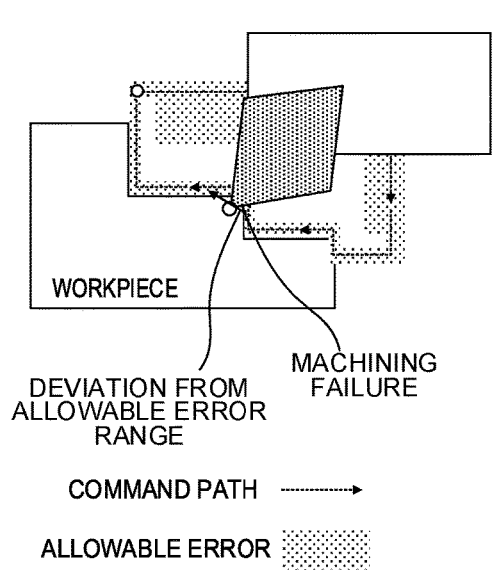
FIGS. 9A and 9B are diagrams for describing a problem caused by the deviation of a tool path.
Figure 9B:
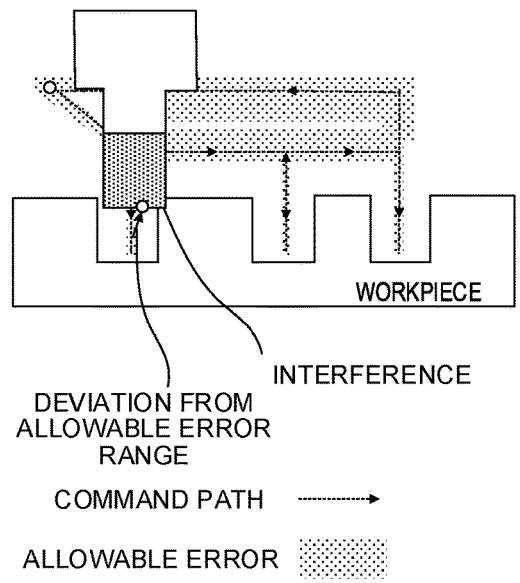

A description will be given, with reference to the flowchart of FIG. 6, of the flow of machine learning performed by the movement-amount adjustment learning section 25 in the machine learning device 20 of FIG. 5. Hereinafter, each step will be described.

(Step SA01) When machine learning starts, the state observation section 21 acquires physical-amount data indicating a state of the machine tool 1.

(Step SA02) The movement-amount adjustment learning section 25 specifies a current state $s_t$ based on the physical-amount data acquired by the state observation section 21.

(Step SA03) The movement-amount adjustment learning section 25 selects an action $a_t$ (adjustment of the movement amount of each axis) based on a past learning result and the state $S_t$ specified in step SA02.

(Step SA04) The action $a_t$ selected in step SA03 is performed.

(Step SA05) The state observation section 21 acquires physical-amount data indicating a state of the machine tool 1, and the operation evaluation section 3 acquires data on an evaluation result obtained by evaluating the state of the machine tool 1. At this stage, the state of the machine tool 1 changes with a temporal transition from time t to time t+1 as a result of the action $a_t$ performed in step SA04.

(Step SA06) The reward calculation section 24 calculates a reward $r_{t+1}$ based on the data on the evaluation result acquired in step SA05.

(Step SA07) The movement-amount adjustment learning section 25 advances the machine learning based on the state $S_t$ specified in step SA02, the action $a_t$ selected in step SA03, and the reward $r_{t+1}$ calculated in step SA06, and then the process returns to step SA02.

The learning result storage section 26 stores a learning result of the movement-amount adjustment learning section 25. Further, when a learning result is used by the movement-amount adjustment learning section 25 again, the learning result storage section 26 outputs a stored learning result to the movement-amount adjustment learning section 25. As described above, a learning result may be stored in such a way that a value function corresponding to a machine learning algorithm to be used is stored in a supervised learning device such as a SVM and a neural network of an approximate function, an arrangement, or a multiple-value output, or the like.

Note that it is also possible for the learning result storage section 26 to receive and store a learning result stored in another machine tools 40 or the intensive management system 30, or possible for the learning result storage section 26 to output a learning result stored in the learning result storage section 26 to another machine tool 40 or the intensive management system 30.

The movement-amount output section 27 outputs an adjustment result of a movement amount by the movement-amount adjustment learning section 25 to the numerical control section 2. The numerical control section 2 drives each axis of the machine tool 1 based on a movement amount of each axis received from the movement-amount output section 27.

Then, the operation evaluation section 3 evaluates a driving result of each axis again, the machine learning device 20 acquires an evaluation result and a current situation of the machine tool 1, and learning is repeatedly performed using input physical-amount data. Thus, the acquisition of a more excellent learning result is allowed.

When optimum movement paths shown in FIGS. 1A and 1B are confirmed as a result of the learning of the machine learning device 20 as described above, the machine learning device 20 completes the learning. Data obtained by collecting a movement amount (command pulse) of each axis over a round of a tool path, which is output from the machine learning device 20 having completed the learning, is equivalent to movement data on a tool.

When the machine tool actually performs machining using learning data for which learning has been completed, the machine learning device 20 may perform a repetitive operation using the learning data for which the learning has been completed as it is, without performing a new learning.

In addition, the machine learning device 20 having completed learning (or the machine learning device 20 in which completed learning data on another machine learning device (not shown) has been copied in the learning result storage section 26) may be attached to other machine tools 1 to perform a repetitive operation using the learning data for which the learning has been completed as it is.

Moreover, it is possible to attach the machine learning device 20 that has completed learning to another machine tool 40 with the learning function of the machine learning device 20 kept valid so that the other machine tool 40 can continue machining of a workpiece. In that case, it is possible for the other machine tool 1 to perform machining operation by causing the attached machine learning device 20 to further learn an individual difference, a secular change, or the like that is peculiar to the machine tool, and searching for better machining conditions for the machine tool 1.

Note that when a learning operation is performed using the numerical control section 2 of the machine tool as described above, the numerical control section 2 may perform learning based on the virtual machining of a workpiece without actually operating the machine tool 1. In addition, as shown in FIG. 7, the machine learning device 20 may be incorporated into a simulation apparatus 4 provided with a simulation section 5 that separately simulates an operation of the machine tool to perform a learning operation based on a simulation result of the simulation section 5. In any case, it is desirable that a workpiece not be actually machined at the initial stage of learning.

Further, the machine tool 1 may perform machine learning alone. However, when each of a plurality of machine tools 1 is further provided with a section used to communicate with an outside, it becomes possible to send/receive and share physical-amount data stored in each of the physical-amount data storage sections 22 and a learning result stored in each of the learning result storage sections 26.

Thus, more efficient machine learning is allowed. For example, when learning is performed with a movement amount fluctuating within a prescribed range, the learning is advanced in parallel between a plurality of machine tools 1 in such a way that physical-amount data and learning data are exchanged between the machine tools 1 while a workpiece is machined with different operation conditions fluctuating within a prescribed range. Thus, efficient learning is allowed.

In order to exchange physical-amount data and learning data between a plurality of machine tools 1 as described above, communication may be performed via a host computer such as the intensive management system 30, the machine tools 1 may directly communicate with each other, or a cloud may be used. However, for handling large amounts of data, a communication section with a faster communication speed is preferably provided.

The embodiment of the present invention is described above. However, the present invention is not limited only to the example of the above embodiment and may be carried out in various aspects with appropriate modifications.

The invention claimed is:

1. A machine tool, comprising:
   an axis;
   a numerical controller configured to drive the axis based on a program to perform machining of a workpiece, the numerical controller configured to output evaluation data to evaluate an operation of the machine tool; and
   a machine learning device that includes a processor programmed to
      perform machine learning of an adjustment of a movement amount of the axis for each control cycle,
      acquire physical-amount data including at least an axis position of the axis of the machine tool and the evaluation data,
      calculate a reward based on the acquired physical-amount data and the acquired evaluation data,
      adjust the movement amount of the axis for each control cycle based on a result of the machine learning of the adjustment of the movement amount of the axis for each control cycle and the acquired physical-amount data, and
      output the adjusted movement amount of the axis for each control cycle,
   wherein the processor is programmed to perform the machine learning of the adjustment of the movement amount of the axis for each control cycle based on the adjusted movement amount of the axis for each control cycle, the acquired physical-amount data after the operation of the machine tool based on the output movement amount of the axis for each control cycle, and the calculated reward, and
   the numerical controller drives the axis of the machine tool to perform machining of the workpiece based on the adjusted movement amount having been completed the machine learning.

2. The machine tool according to claim 1, wherein the processor is further programmed to calculate a positive reward when a combined speed of the axis is fast and configured to calculate a negative reward when there is a deviation from a range of a command path commanded by the program.

3. The machine tool according to claim 1, wherein the machine tool is connected to at least one another machine tool and configured to mutually exchange or share the result of the machine learning with said at least one another machine tool.

4. The machine tool according to claim 3, wherein the processor is further programmed to perform, in order to make the reward maximum, the machine learning using the adjusted movement amount of the axis for each control cycle and an evaluation function in which the acquired physical-amount data is expressed by an argument.

* * * * *